US012232592B1

(12) United States Patent
Covey et al.

(10) Patent No.: US 12,232,592 B1
(45) Date of Patent: Feb. 25, 2025

(54) VANITY MIRROR

(71) Applicant: MerchSource, LLC, Irvine, CA (US)

(72) Inventors: Keith Lawrence Covey, Costa Mesa, CA (US); Adam Sbeglia, Fullerton, CA (US); Samuel Joseph McClellan, Venice, CA (US); David Yang, Santa Ana, CA (US); Daniel Douglas, Irvine, CA (US)

(73) Assignee: MerchSource, LLC, Irvine, CA (US)

( * ) Notice: Subject to any disclaimer, the term of this patent is extended or adjusted under 35 U.S.C. 154(b) by 0 days.

(21) Appl. No.: 18/381,547

(22) Filed: Oct. 18, 2023

Related U.S. Application Data

(60) Provisional application No. 63/417,249, filed on Oct. 18, 2022.

(51) Int. Cl.

| | |
|---|---|
| ***A45D 42/10*** | (2006.01) |
| ***F21V 33/00*** | (2006.01) |
| ***F21W 131/302*** | (2006.01) |
| ***H04R 1/02*** | (2006.01) |
| ***H04R 5/02*** | (2006.01) |

(52) U.S. Cl.
CPC ............ *A45D 42/10* (2013.01); *F21V 33/004* (2013.01); *F21V 33/0056* (2013.01); *H04R 1/028* (2013.01); *H04R 5/02* (2013.01); *F21W 2131/302* (2013.01)

(58) Field of Classification Search
CPC ... A45D 42/10; F21V 33/004; F21V 33/0056; F21W 2131/302; H04R 1/028; H04R 5/02
See application file for complete search history.

(56) References Cited

U.S. PATENT DOCUMENTS

| | | | | |
|---|---|---|---|---|
| 8,162,502 | B1 | 4/2012 | Zadro | |
| 8,356,908 | B1 | 1/2013 | Zadro | |
| 9,347,660 | B1 | 5/2016 | Zadro | |
| 9,897,306 | B2 | 2/2018 | Yang et al. | |
| 9,958,149 | B2 * | 5/2018 | You | F21K 9/235 |
| 10,869,537 | B2 | 12/2020 | Yang et al. | |
| 10,998,735 | B2 * | 5/2021 | Chien | G09F 23/00 |
| 11,109,694 | B2 * | 9/2021 | Shin | A61B 5/0079 |
| 2009/0272659 | A1 * | 11/2009 | Kaiser | A45D 33/20 132/316 |

* cited by examiner

*Primary Examiner* — Jason M Han
(74) *Attorney, Agent, or Firm* — Avyno Law P.C.

(57) ABSTRACT

A mirror includes a base portion configured to support the mirror, a mirror head assembly, and a support portion connected to the base portion and configured to support the mirror head assembly. The mirror head assembly includes a first mirror plate, a second mirror plate, a first light-transmissive region adjacent to the first mirror plate, a second light-transmissive region adjacent to the second mirror plate, and a light source disposed in an interior of the mirror head assembly and configured to emit light to the first light-transmissive region and the second light-transmissive region. The base portion may include one or more audio speakers and/or storage compartments and/or charging pads configured for wirelessly charging an electronic device.

20 Claims, 16 Drawing Sheets

FIG. 13
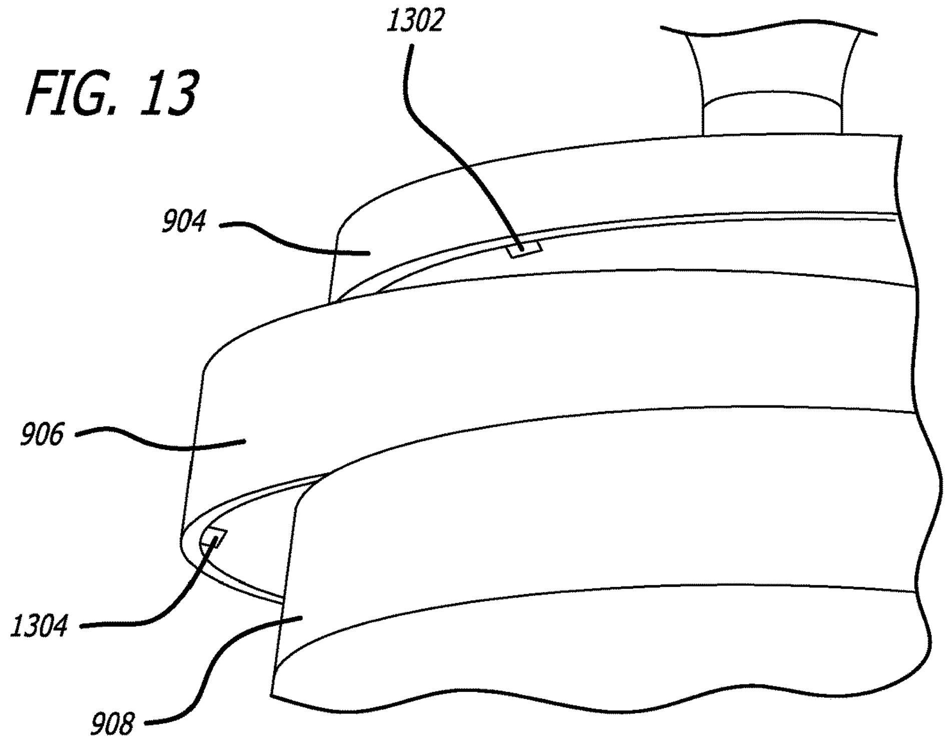
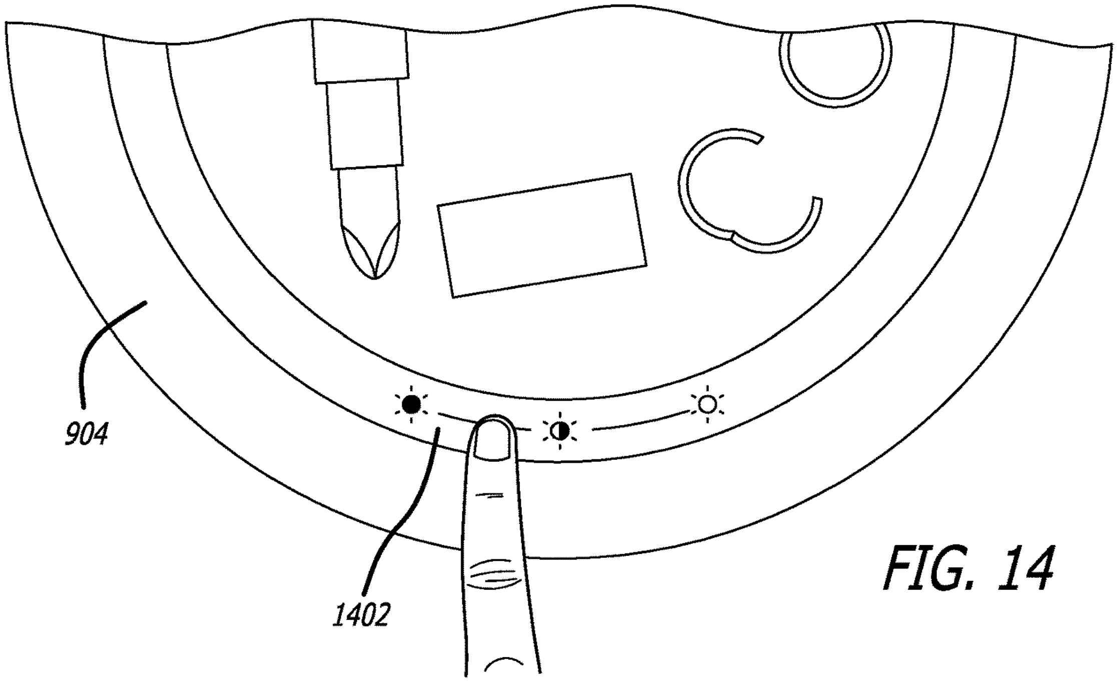
FIG. 14

VANITY MIRROR

RELATED APPLICATIONS

This application claims the benefit under 35 U.S.C. § 119(e) of U.S. Provisional Patent Application Ser. No. 63/417,249, filed on Oct. 18, 2022, titled "VANITY MIRROR," the entire contents of which are incorporated by reference herein.

FIELD OF THE INVENTION

The invention relates to a vanity mirror for facilitating performance of personal appearance related functions such as applying cosmetics, personal grooming or the like. More particularly, the invention relates to a versatile vanity mirror that includes a base having speakers, storage compartments or electronic device charging capabilities.

BACKGROUND OF THE INVENTION

Mirrors, particularly vanity mirrors are mirrors that are typically used for reflecting an image of a user during personal grooming, cosmetic care, or the like. Vanity mirrors are available in different configurations, such as free-standing mirrors, hand-held mirrors, mirrors connected to vanity tables, bathroom wall mirrors, car mirrors, and/or mirrors attached to or produced by electronic screens or devices.

While many vanity mirrors exist, such vanity mirrors only provide personal appearance related functions and therefore, lack versatility. Therefore, a need exists for a vanity mirror that not only allows for personal appearance related functions but also for additional functionalities, including but not limited to audio, storage and/or wireless charging capabilities.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to an implementation, a mirror includes: a base portion configured to support the mirror on a surface; a support portion connected to the base portion; and a mirror head assembly, where the support portion is configured to support the mirror head assembly.

In an implementation, the mirror head assembly includes: a front side and a back side opposing the front side; a first mirror plate positioned at the front side; a second mirror plate positioned at the back side; a first light-transmissive region positioned adjacent to the first mirror plate; a second light-transmissive region positioned adjacent to the second mirror plate; a mirror frame configured to support the first mirror plate, the second mirror plate, the first light-transmissive region, and the second light-transmissive region; and a light source disposed in an interior of the mirror head assembly and configured to emit light to the first light-transmissive region and the second light-transmissive region.

In an implementation, the base portion includes one or more of the following: one or more audio speakers; one or more storage compartments; and/or one or more charging pads configured for wirelessly charging an electronic device.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DESCRIPTION OF THE FIGURES

The invention may be better understood by referring to the following figures. The components in the figures are not necessarily to scale, emphasis instead being placed upon illustrating the principles of the invention.

FIG. 13 is a bottom perspective view of one of the trays of the vanity mirror of FIG. 9.

FIG. 14 is a top view of the base portion of the vanity mirror of FIG. 9.

Figure 1:
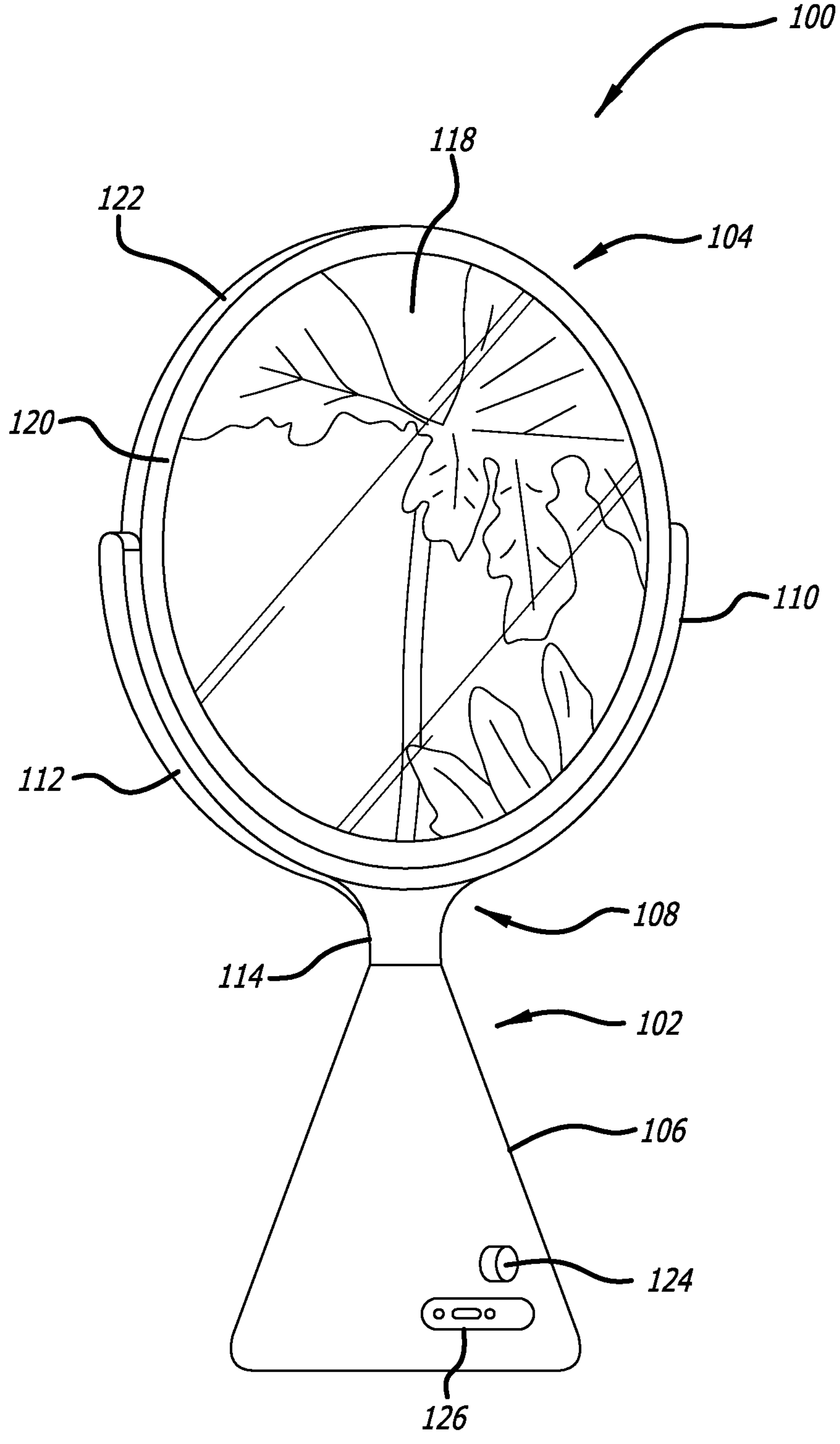
FIG. 1 is a front perspective view of the front side of one example of a vanity mirror of the present invention.

The illustrations in the drawing figures are considered to be schematic, unless specifically indicated otherwise.

DESCRIPTION OF THE INVENTION

Embodiments are described more fully below in sufficient detail to enable those skilled in the art to practice the system and method. However, embodiments may be implemented in many different forms and should not be construed as being limited to the embodiments set forth herein. Additionally, it is to be understood that any of various features disclosed herein may be used in any combination and are not limited to use in the express context shown (i.e., features may be mixed and matched, as appreciated by one skilled in the art). The following detailed description is, therefore, not to be taken in a limiting sense.

When elements are referred to as being "connected" or "coupled," the elements can be directly connected or coupled together, or one or more intervening elements may also be present. In contrast, when elements are referred to as being "directly connected" or "directly coupled," there are no intervening elements present.

FIG. 1 is a front perspective view of the front side of one example of a vanity mirror 100 of the present invention. As shown in FIG. 1, the mirror 100 may include a housing portion 102 and a mirror head or mirror head assembly 104. The housing portion 102 can include a base portion 106 and a support portion 108. The base portion 106 is configured to support the mirror 100 on an underlying surface (e.g., the top surface of a counter, table, bench, other type of furniture or structure, etc.). The support portion 108 is connected (or attached, coupled, adjoined, etc.) to the base portion 106 and is configured to support the mirror head assembly 104. For this purpose, the support portion 108 may be interconnected between the base portion 106 and the mirror head assembly 104. The support portion 108 may include a hollow stanchion or shaft 114 and two yoke arms 110, 112 (a first yoke arm 110 and a second yoke arm 112) that extend upwardly from the shaft 114 in a curved manner. The first yoke arm 110 and the second yoke arm 112 may at least partially surround the mirror head assembly 104 as shown. The height of the stanchion or shaft 114 can be adjusted thereby allowing the shaft 114 to elongate at various heights, thereby allowing adjustment to the height (elevation) of the mirror head assembly 104, depending on the needs of the user.

The mirror head assembly 104 may be rotatably attached between the two yoke arms 110, 112. The mirror head assembly 104 may include at least a mirror frame 122 that supports (and may at least partially enclose, or at least partially circumferentially surround the outer perimeter of) a first mirror plate 118 and a first light transmissive region 120 that is positioned adjacent to the first mirror plate 118. As shown, the first light transmissive region 120 may be at least partially circumferentially disposed (or surround) around the outer perimeter of the first mirror plate 118.

As further shown, the base portion 106 attaches to the shaft 114. While the base portion 106 is shown to be a conical shape, it should be understood that the base portion may have any shape, including but not limited to a square, rectangle or globe. As will be shown and described further in FIG. 7, a benefit of having the base portion 106 shaped as a cone is that it allows speakers to be positioned such that they angle upward towards the user, which ultimately produces a greater audio sound and experience for the user. As also shown in FIG. 1, base portion 106 may include an audio control knob 124 and brightness controls 126, where such brightness controls may use capacitive touch technology, which is well-known in the art.

Figure 2:
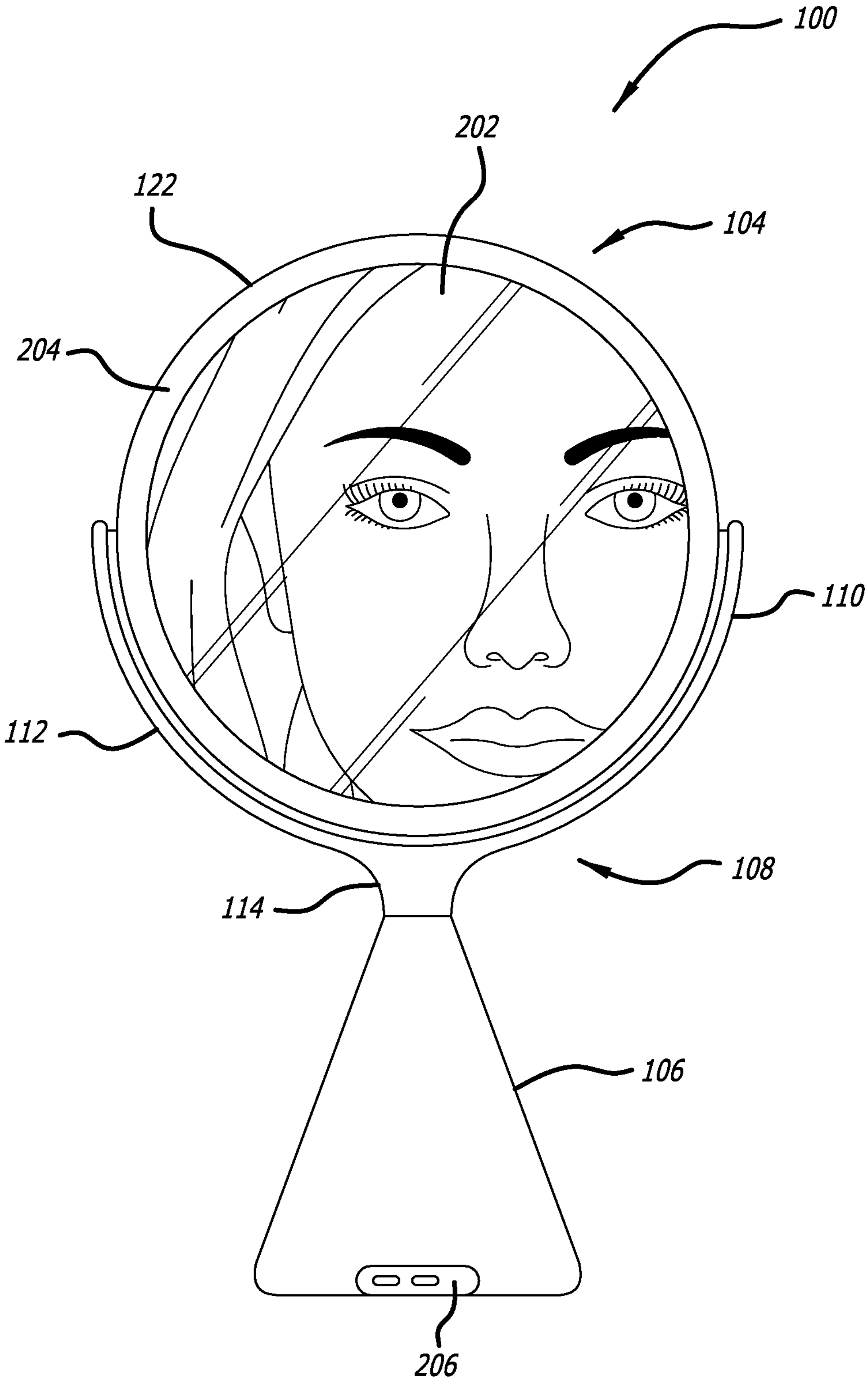
FIG. 2 is a rear view of the vanity mirror of FIG. 1.

FIG. 2 is a rear view of the vanity mirror 100 of FIG. 1. FIG. 2 specifically shows the rear side of the mirror head assembly 104 having a second mirror plate 202 and a second light transmissive region 204 that is positioned adjacent to the second mirror plate 202. In other words, mirror 100 may be a dual-sided mirror. Similar to the front side of the mirror head assembly 104, the second light transmissive region 204 may be at least partially circumferentially disposed around the outer perimeter of the second mirror plate 202. It should further be understood that first and second mirror plates 118, 202 may provide different magnification factors (e.g, 1×, 2×, 3×, 4×, 5×, 6× . . . etc.). For example, first mirror plate 118 may have a magnification factor of 1× while second mirror plate may have a magnification factor of 8×.

As also shown in FIG. 2, the rear side of the base portion 106 may include one or more electrical (e.g., input/output) ports 206 and an on/off power button. The input/output ports 206 may be USB ports that provide charging to the mirror 100 (i.e., by being placed in electrical communication with an electrical charging device (e.g., an external charging device configured for charging batteries of the mirror 100 such as described below) or that allow an electronic device (e.g., a computing device such as a mobile telephone device, a tablet computer, a laptop computer, a desktop computer, a smart watch, a music player, etc.) to be connected to the mirror 100 to allow music to be played from the electronic device to the speakers or to allow an electronic device to charge when plugged into the mirror 100.

Figure 3:
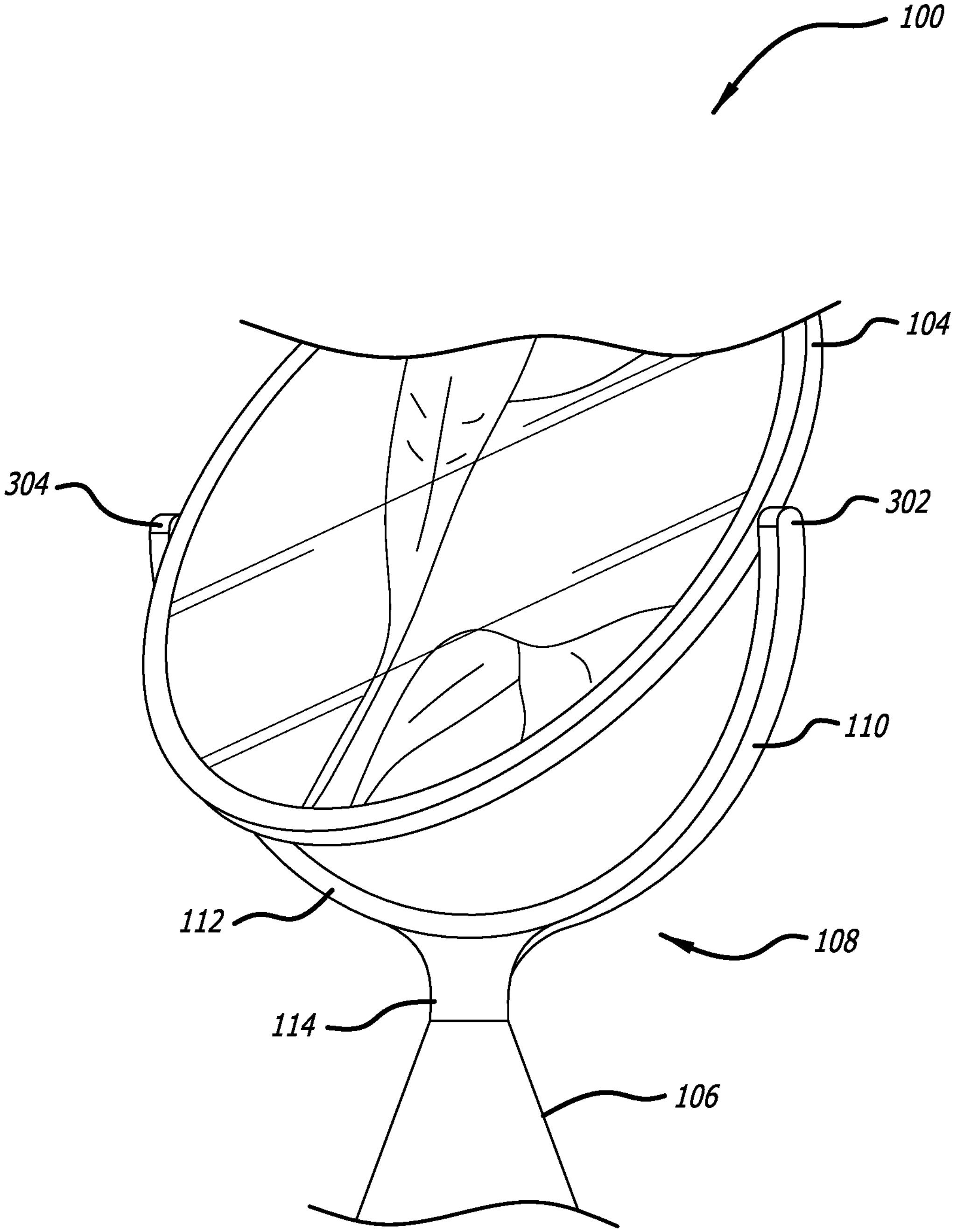
FIG. 3 is a perspective view of the vanity mirror of FIG. 1 where the mirror head assembly is tilted.

FIG. 3 is a perspective view of the vanity mirror 100 of FIG. 1 where the mirror head assembly 104 is tilted relative to arms 110, 112. As shown, mirror head assembly 104 may be rotatably attached to free ends 302, 304 of the yoke arms 110, 112. The mirror head assembly may continuously rotate relative to the yoke arms 110, 112 or may rotate 180 degrees relative to the yoke arms 110, 112. Such rotation allows for the mirror head assembly to be angled at various degrees.

Figure 4:
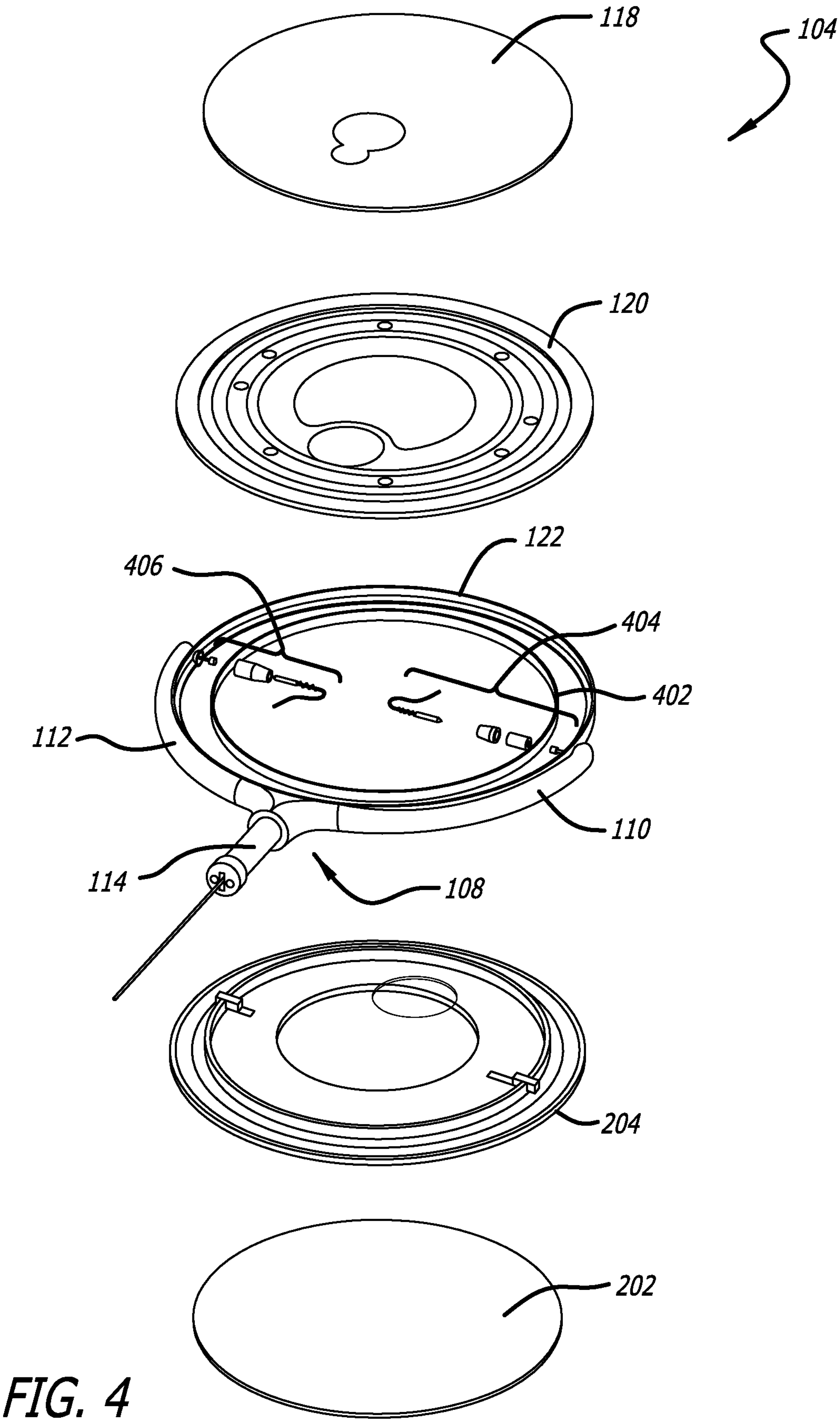
FIG. 4 is an exploded view of the mirror head assembly of FIG. 1.

FIG. 4 is an exploded view of the mirror head assembly 104 of FIG. 1. As shown, the mirror head assembly 104 may include a first mirror plate 118, a first light transmissive region 120, a light source (or illumination source) 402, a second light transmissive region 204 and a second mirror plate 202. The light source 402 is disposed in the interior of the mirror head assembly 104 and is configured to emit light to the first light-transmissive region 120 and the second light-transmissive region 204. The first and second light transmissive regions 120, 204 are light transmissive, for example being made of a transparent material having frosted inner facing surfaces. By this configuration, the light emitted from the light source 402 that passes through the first and second light transmissive regions or bands 120, 204 is diffused. As further shown in the figures, the light source 402 may be an elongated, thin, narrow strip made of a flexible material including a printed circuit board bent into an arcuately curved beam (or strip, plate, ring, etc.) having a plurality of longitudinally or circumferentially spaced apart light emitters (or light source units) such as light emitting diodes (LED's). In other examples, rather than LED's, other light emitters can be used (e.g., fluorescent light sources, incandescent light sources, halogen light sources, etc.). As further described in FIG. 5, the mirror head assembly 104 may also include first and second electrical contact assemblies 404, 406, for providing constant electrical communication between the electrical components in the mirror head assembly 104 and the electrical components in the housing portion 102. The light source 402, first electrical contact assembly 404, and second electrical contact assembly 406 may be cooperatively enclosed by the mirror frame 122, the first mirror plate 118, and the second mirror plate 202. In other words, the mirror frame 122, the first mirror plate 118, and the second mirror plate 202 cooperatively define an interior of the mirror head assembly 104 that contains the light source 402, first electrical contact assembly 404, and second electrical contact assembly 406. That is, the light source 402, first electrical contact assembly 404, and second electrical contact assembly 406 are disposed in the interior of the mirror head assembly 104.

Figure 5:
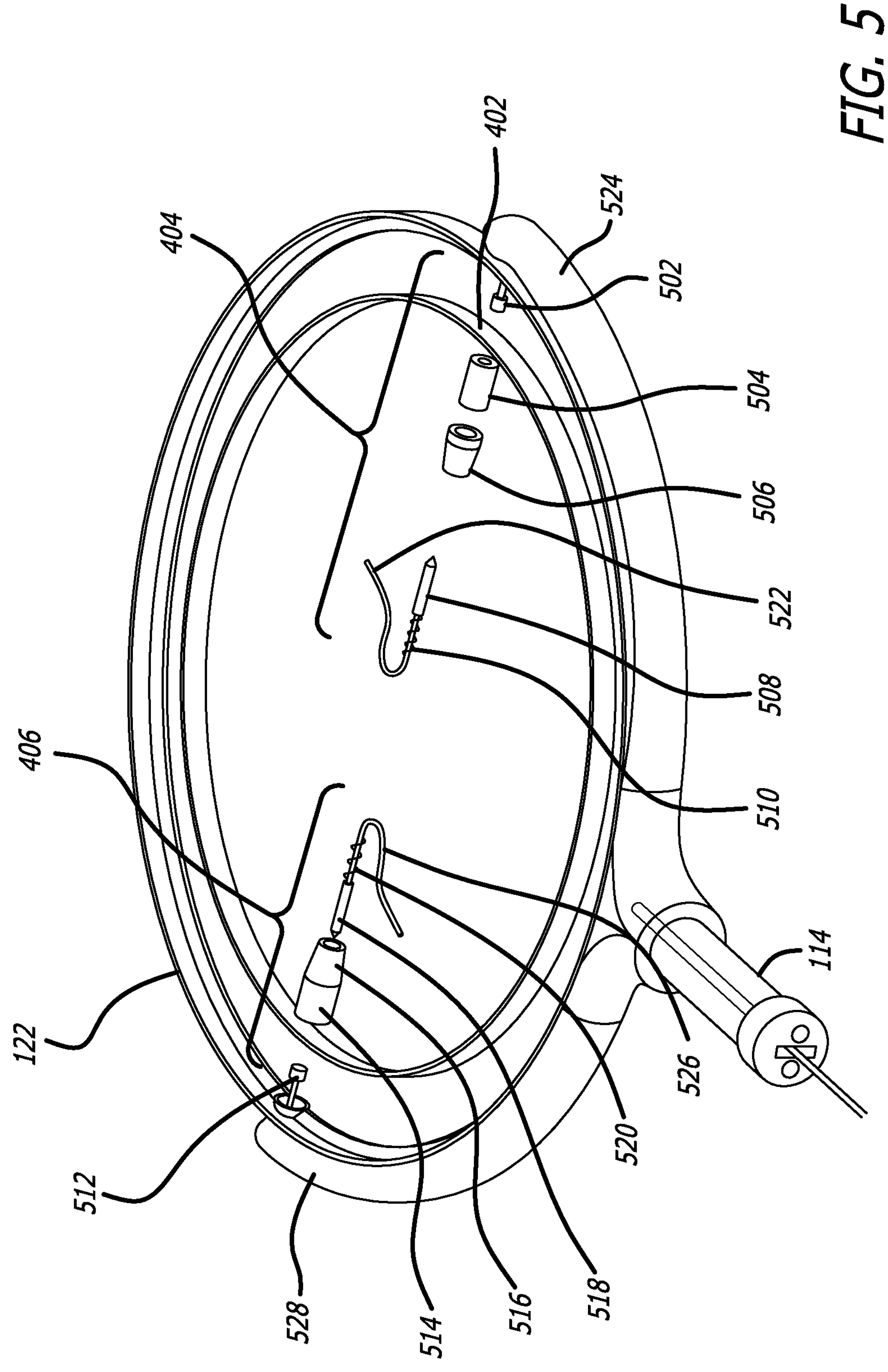
FIG. 5 is an internal view of the mirror head assembly of FIG. 1.

FIG. 5 is an internal view of the mirror head assembly 104 of FIG. 1. In particular, FIG. 5 shows the various parts and components of the first and second electrical contact assemblies 404, 406. In particular, the first electrical contact assembly 404 may include a first electrically conductive cap (or contact, electrode, etc.) such as a first brass cap 502, where one end of the first brass cap 502 connects to a first wire 524 (the first wire 524 may be negative or positive and may run through the first yoke arm 110 down to a main board located within the housing portion 102) and where the opposing end of the brass cap 502 electrically contacts a first contact pin 508 such that the first contact pin 508 can rotate relative to the first brass cap 502 while electrical communication is maintained between the first brass cap 502 and the first contact pin 508. It should be emphasized that the connection between the first brass cap 502 and the first contact pin 508 occurs within the mirror frame 122 as opposed to outside the mirror frame 122. Such positioning inside the mirror frame 122 reduces the probability or risk of severing the electrical connection between the first brass cap 502 and the first contact pin 508. The first electrical contact assembly 404 may be connected to the support portion 108, in particular to the first yoke arm 110. In the present example, a first arm support 504 may be provided to add further stability and support to the first yoke arm 110. Further, a first end cap 506 may also be provided to cover the first arm support 504 and the first brass cap 502. The first contact pin 508 further includes a first spring 510 that pushes the first contact pin 508 towards the first brass cap 502 in order to further ensure that constant electrical contact is made between the first contact pin 508 and the first brass cap 502. The first contact pin 508 may further connect to a first contact pin wire 522 that connects to the light source or LED strip 402.

Similar to the first electrical contact assembly 404, the second electrical contact assembly 406 may include a second electrically conductive cap such as a second brass cap 512, where one end of the second brass cap 512 connects to a second wire 528 (the second wire 528 may be negative or positive and may run through the second yoke arm 112 down to a main board located within the housing portion 102) and where the opposing end of the second brass cap 512 electrically contacts a second contact pin 518 such that the second contact pin 518 can rotate relative to the second brass cap 512 while electrical communication is maintained between the second brass cap 512 and the second contact pin 518. It should also be emphasized that the connection between the second brass cap 512 and the second contact pin 518 also occurs within the mirror frame 122 as opposed to outside the mirror frame 122. Such positioning inside the mirror frame 122 reduces the probability or risk of severing the electrical connection between the second brass cap 512 and the second contact pin 518. The second electrical contact assembly 406 may be connected to the support portion 108, in particular to the second yoke arm 112. In the present example, a second arm support 514 may be provided to add further stability and support to the second yoke arm 112. Further, a second end cap 516 may also be provided to cover the second arm support 514 and the second brass cap 512. The second contact pin 518 further includes a second spring 520 that pushes the second contact pin 518 towards the second brass cap 512 in order to further ensure that constant electrical contact is made between the second contact pin 518 and the second brass cap 512. The second contact pin 518 may further connect to a second contact pin wire 526 that connects to the light source or LED strip 402.

As further shown in FIG. 5, the first and second wires 524, 528 may both run through each respective yoke arm 110, 112 and down through the shaft 114 for connecting to a main board located in the housing portion 102 or base portion 106.

Figure 6C:
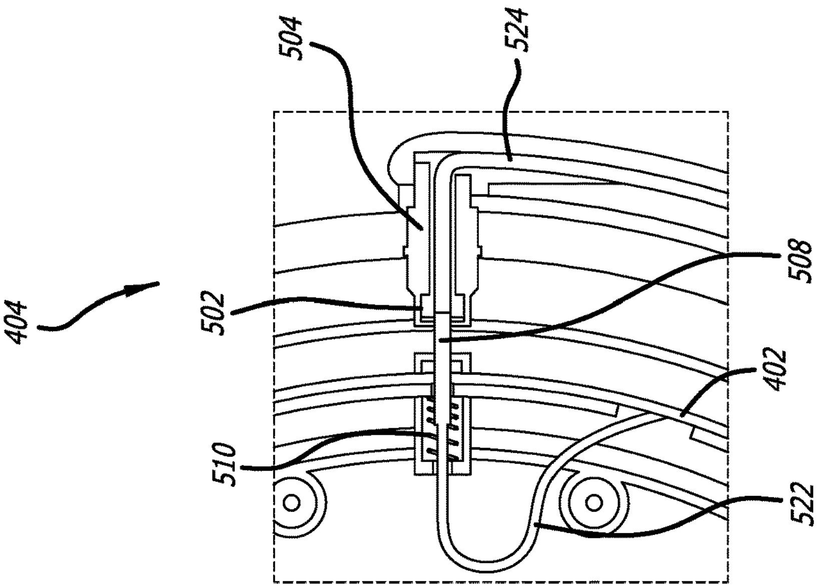
FIGS. 6A-6C are internal views of the mirror head assembly attached to the support portion of the vanity mirror of FIG. 1.
Figure 6B:
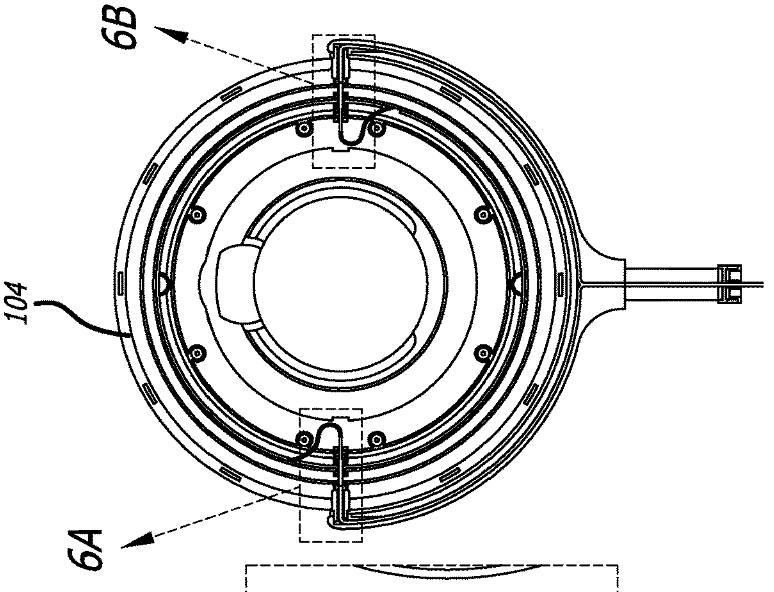
Figure 6A:
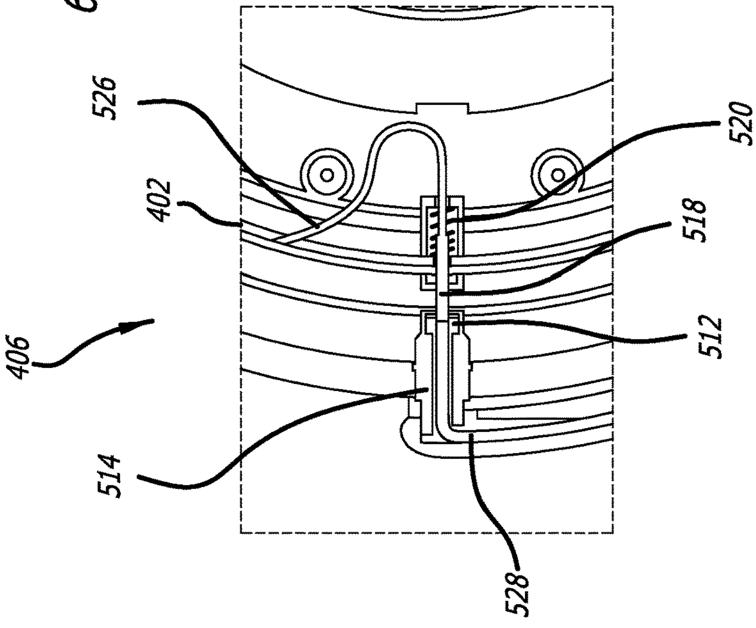

FIGS. 6A-6C are internal views of the mirror head assembly 104 attached to the support portion 108 of the vanity mirror 100 of FIG. 1. As discussed above in connection with FIG. 5, FIGS. 6A-6C show the connections of the various parts and components of the first and second electrical contact assemblies 404, 406. In particular, the figures show wires 522, 526 attaching to the light source or LED strip 402.

Figure 7:
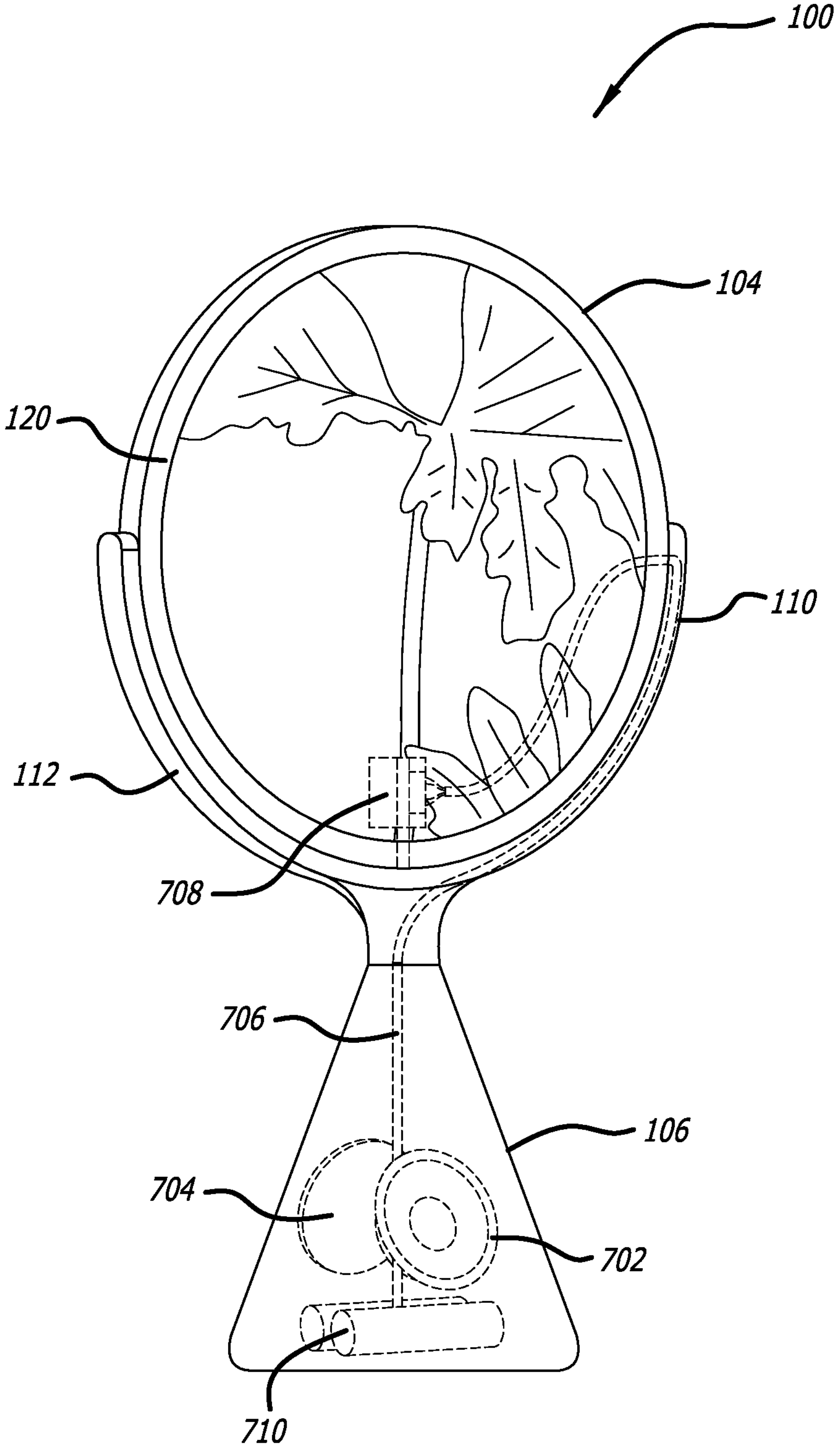
FIG. 7 is a front perspective view of the internals of the base portion of the vanity mirror of FIG. 1.

FIG. 7 is a front perspective view of the internals of the base portion 106 of the vanity mirror of FIG. 1. As shown, the base portion 106 may include (and may house or enclose) one or more audio speakers, such as a front facing speaker driver 702 and a rear facing speaker passive radiator 704 for providing premium audio quality. The speaker driver 702 and speaker passive radiator 704 may further be angled upward such that the speakers 702, 704 provide audio or sound directly to the face of the user when the user is using the vanity mirror 100. The base portion 106 may further include (and may house or enclose) an electrical power source 710. The electrical power source 710 may be or include batteries (which may be rechargeable) as illustrated, or alternatively power circuitry configured to communicate with an external power cord that can be plugged into an appropriate electrical receptacle (e.g., a household power outlet). A printed circuit board 708 such as an LED board is also shown in FIG. 7 housed within mirror head assembly 104. A cable 706 may further be provided that runs from the electrical power source 710 to the printed circuit board 708 for providing power to the printed circuit board 708. It should further be noted that while FIG. 7 shows two speakers 702, 704, any number of speakers may be provided in the base portion 106.

Figure 8:
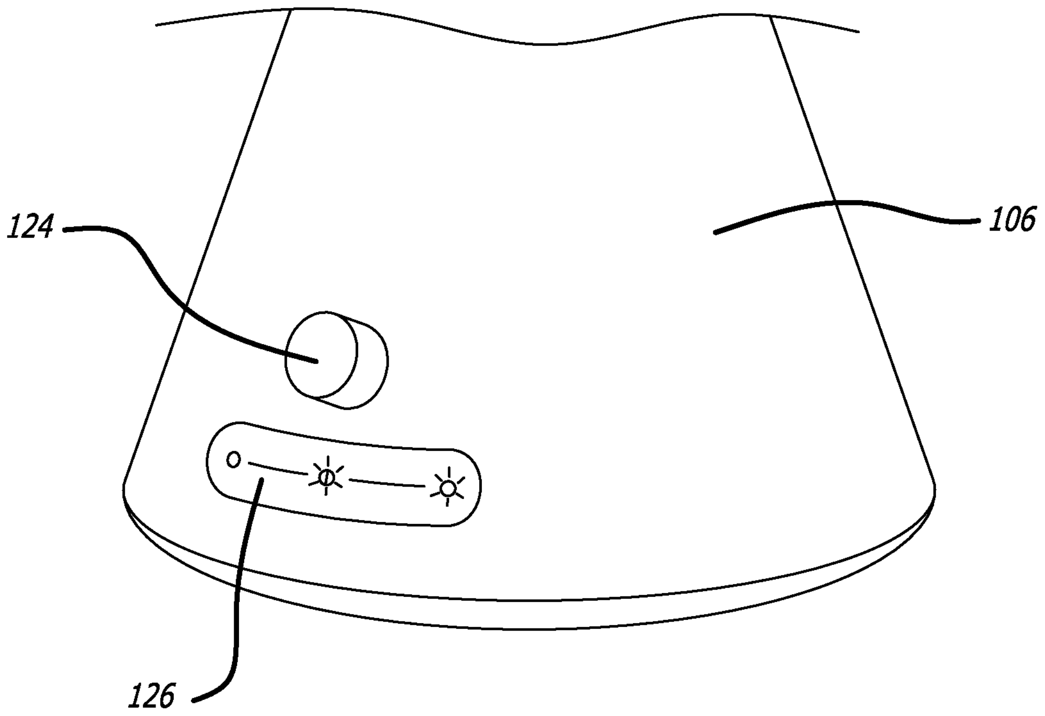
FIG. 8 is a close-up view of the base portion of the vanity mirror of FIG. 1.

FIG. 8 is a close-up view of the base portion of the vanity mirror of FIG. 1. As shown, the base portion 106 may include control buttons that separately control the audio of the speakers 702, 704 and light that is transmitted to the first and second transmissive regions 120, 204. In particular, the audio control 124 may be provided in the form of a dial, where the pressing of the dial plays/pauses the audio and the turning of the dial controls the volume. The light control 126 may be provided through a touch interface using capacitive touch technology, which is well known in the art. In operation, a user may control the brightness of the light by sliding a finger from left to right on the light control 126. Alternatively, a user may also control the brightness of the light by directly touching or tapping the three stages of brightness as shown in 126 of FIG. 8: light off (far left icon), light half brightness (middle icon), and light full brightness (far right icon).

Figure 9:
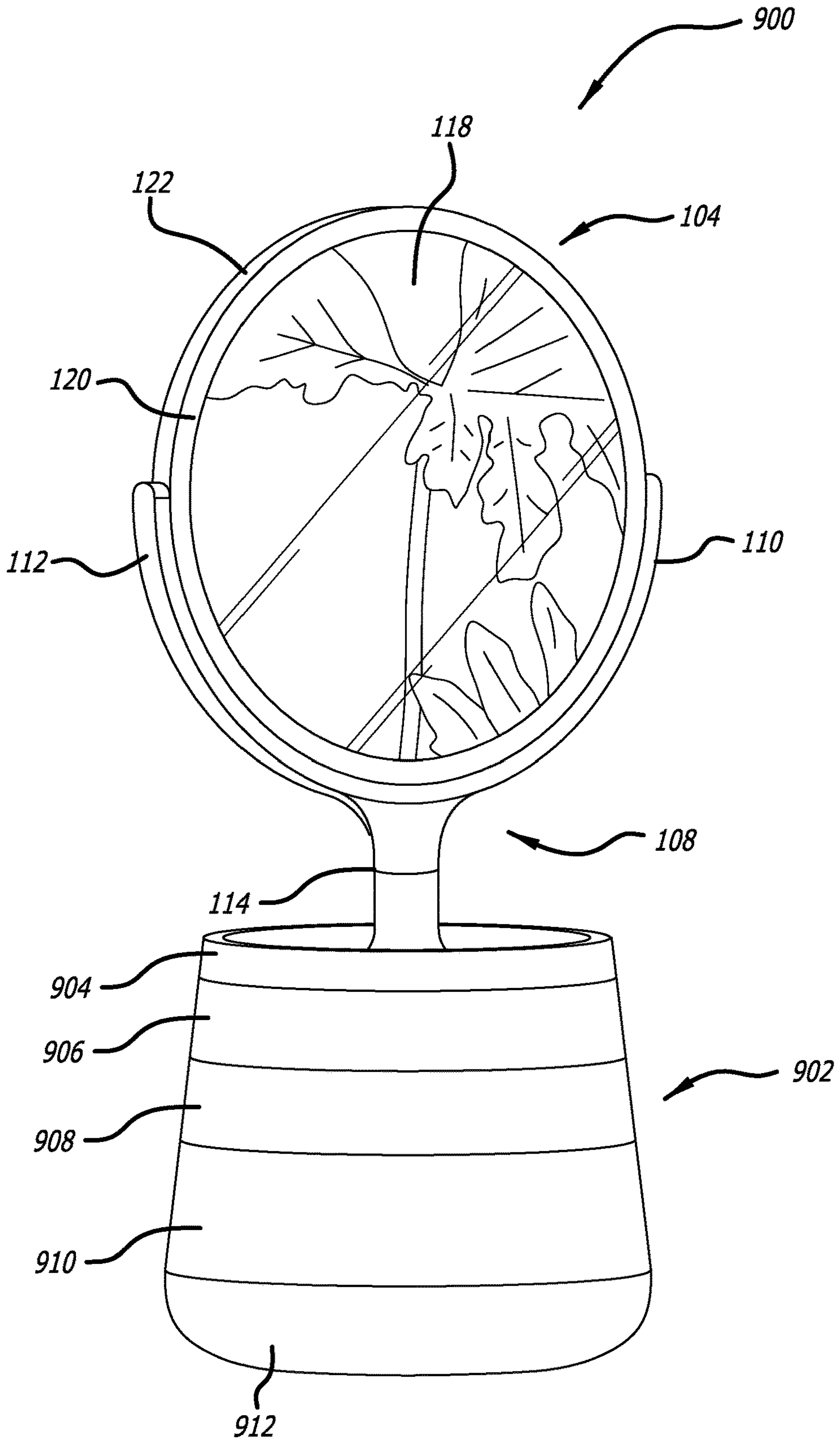
FIG. 9 is a front perspective view of the front side of another example of a vanity mirror of the present invention.

FIG. 9 is a front perspective view of the front side of another example of a vanity mirror 900 of the present invention. In particular, FIG. 9 shows a vanity mirror including all the same structure/parts as shown and described in connection with the vanity mirror 100 except with a different base portion 902. In particular, the base portion 902 of the vanity mirror 900 may have storage capability. The base portion 902 may include any number of storage trays (or storage compartments). As shown, the base portion may include a top tray 904, a first middle tray 906, a second middle tray 908, a third middle tray 910 and a base 912. As will be discussed further below, one or more of the storage trays may be sized differently from the other trays to store different shapes and sizes of various storage items.

Figure 10:
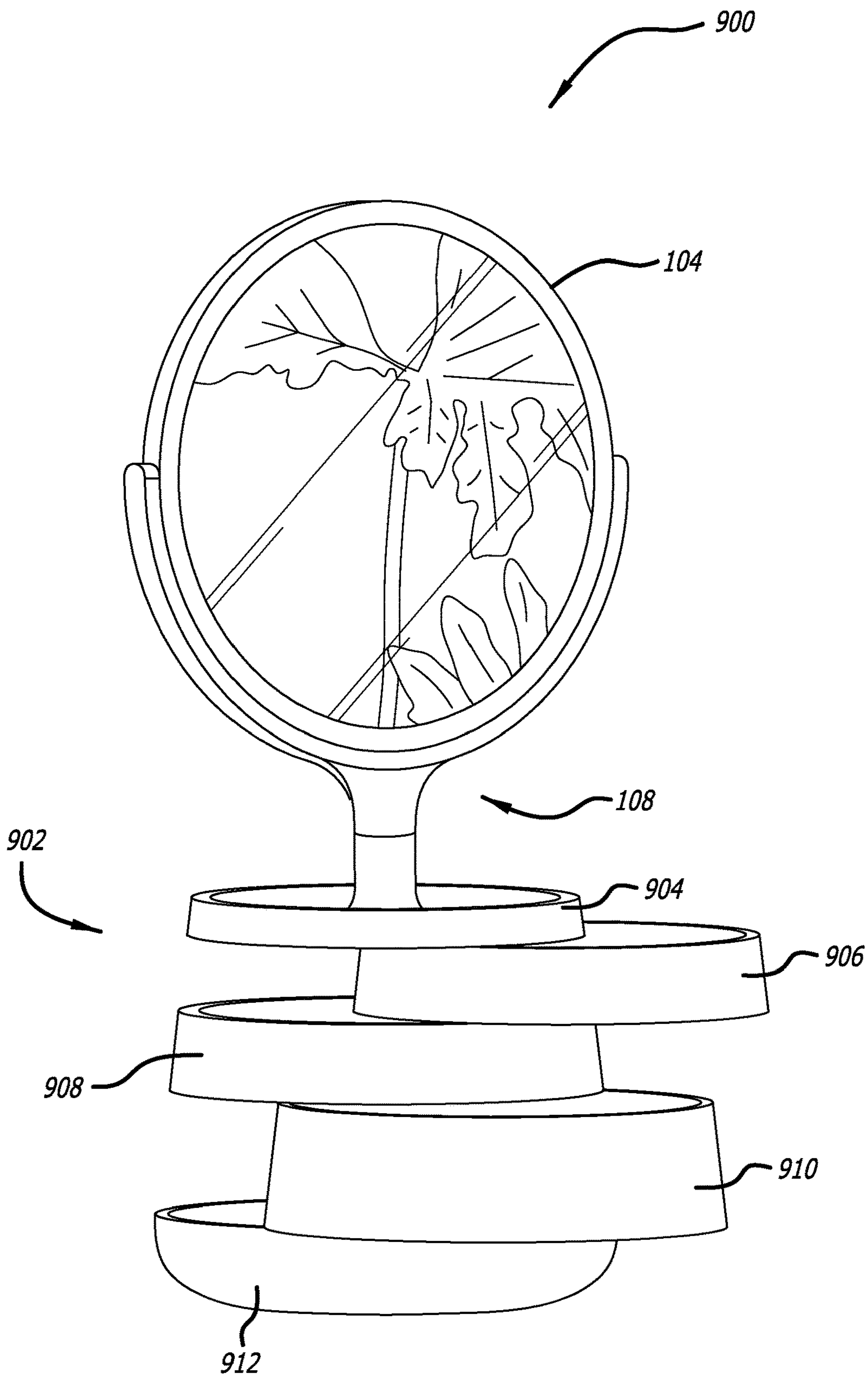
FIG. 10 is a front perspective view of the front side of the vanity mirror of FIG. 9 where the trays of the vanity mirror are in an open position.

FIG. 10 is a front perspective view of the front side of the vanity mirror of FIG. 9 where the trays 906, 908, 910 of the vanity mirror 900 are in an open position. In particular, the trays 906, 908, 910 may rotate out from a fixed column. FIG.

10 also shows that the trays 906, 908, 910 may have different heights to accommodate different sizes of storage items. For example, the tray 910 is shown to be sized bigger or taller than the trays 906, 908. It should also be understood that while the trays 906, 908, 910 may rotate out from a fixed column, in other examples of the present invention, the trays 906, 908, 910 may be pulled horizontally, similar to a drawer or dresser. More generally, the trays 906, 908, 910 are movable between a closed position at which the interiors of the trays 906, 908, 910 are not accessible and an open position at which the interiors of the trays 906, 908, 910 are accessible (e.g., for loading or removing storage items).

Figure 11:
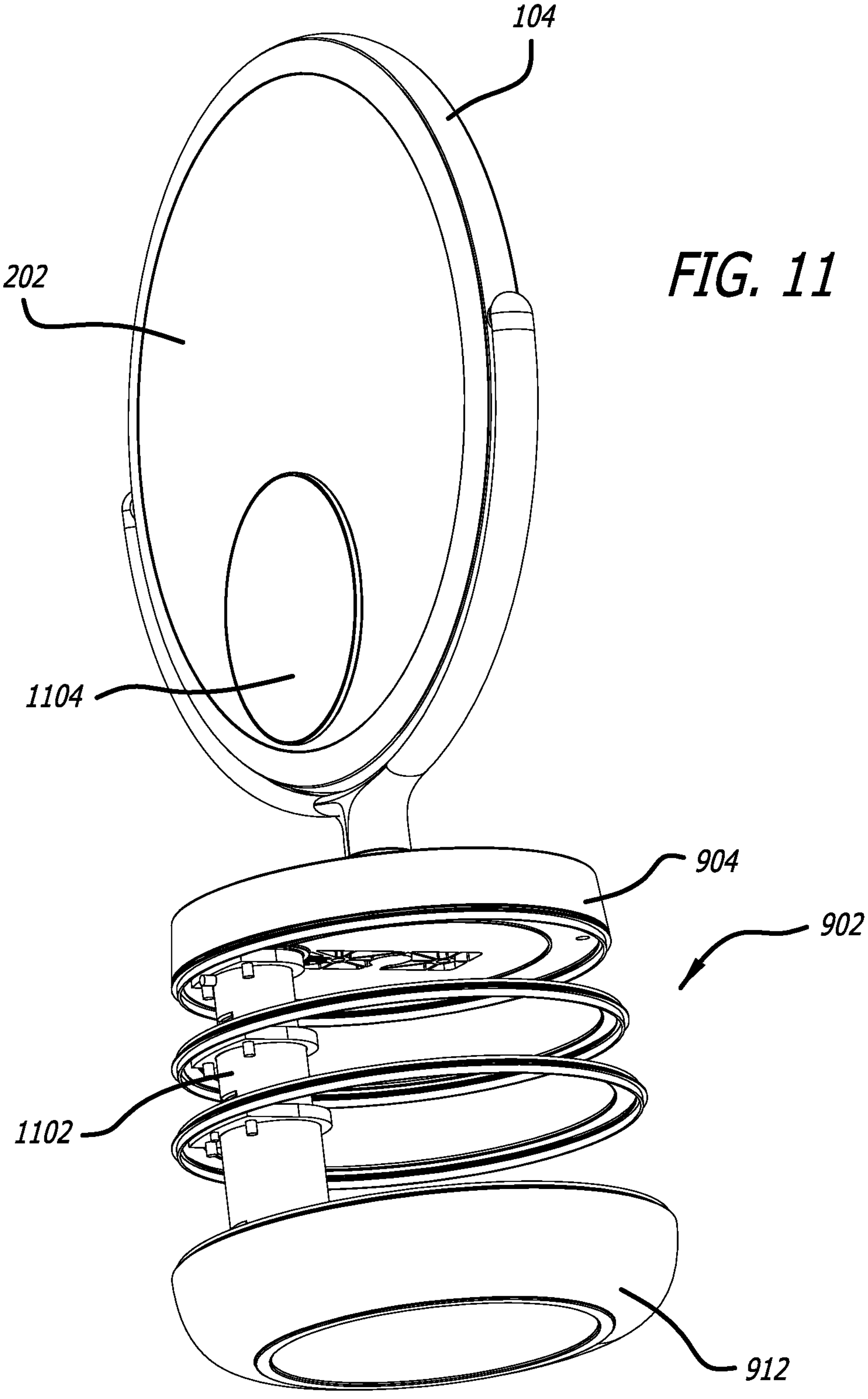
FIG. 11 is an internal view of the base portion of the vanity mirror of FIG. 9.

FIG. 11 is an internal view of the base portion 904 of the vanity mirror 900 of FIG. 9. In particular, FIG. 11 shows the fixed column 1102 about which the trays 906, 908, 910 may rotate between the closed and open positions. FIG. 11 also shows a mini mirror 1104, which may be an add-on accessory and may attach to either the first or second mirror plates 118, 202 and offer a higher magnification (e.g., 10×) compared to the magnifications of the first or second mirror plates 118, 202. It should further be understood that such mini mirror 1104 may also be incorporated in both vanity mirror 100 and vanity mirror 1500.

Figure 12A:
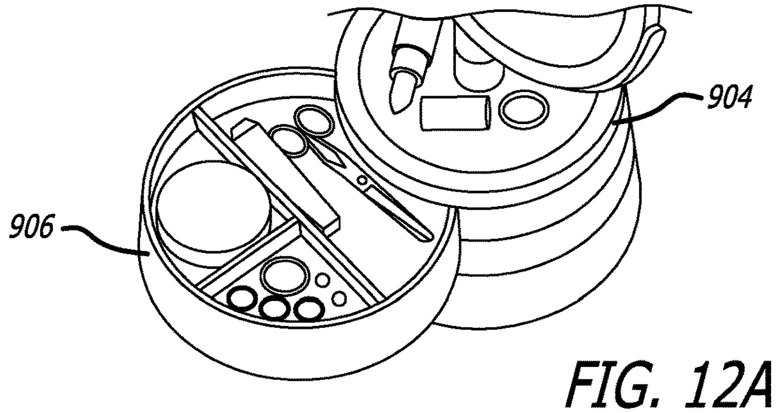
FIGS. 12A-12C are top perspective views of the trays of the vanity mirror of FIG. 9 in an open position holding items.
Figure 12B:
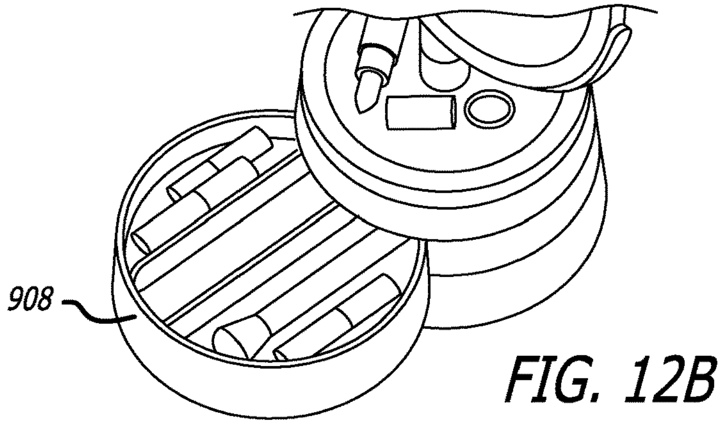
Figure 12C:
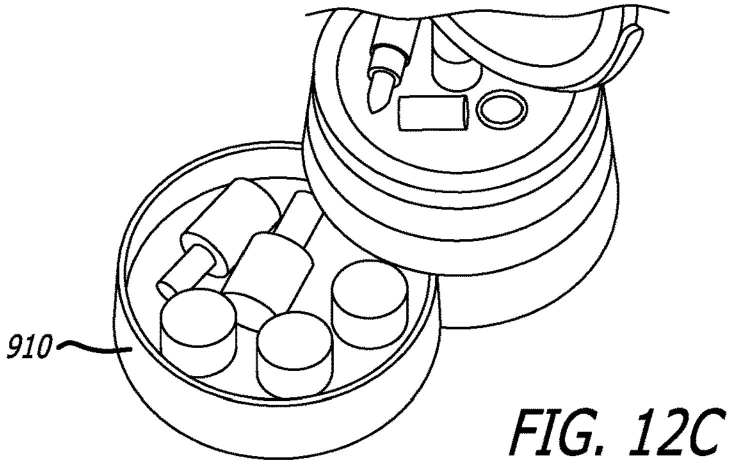

FIGS. 12A-12C are top perspective views of the trays 906, 908, 910 of the vanity mirror 900 of FIG. 9 in an open position and holding storage items (e.g, jewelry, cosmetics, lotions, perfume, etc.). In particular, each tray 906, 908, 910 may be split into any number of storage sections for better organization purposes. The top tray 904 may also be used to hold storage items. While not shown, each tray 906, 908, 910 may include at least one light source (e.g., an LED) embedded into the column 1102 such that when a tray opens, the light source is activated to illuminate the storage items stored within each respective tray.

FIG. 13 is a bottom perspective view of one of the trays 906 of the vanity mirror 900 of FIG. 9. In particular, a magnet 1302, 1304, may be positioned on the underside of each tray 904, 906, 908. The purposes of these magnets are so that as each tray 906, 908, 910 closes, the magnets may connect with the metal rim of the tray below for locking or securely fastening the trays in together in a closed position. While magnets may be utilized, it should be understood that other fastening mechanisms may be utilized to secure the trays in a closed position, including but not limited to, hook and loop fasteners and clips.

FIG. 14 is a top view of the base portion 902 of the vanity mirror 900 of FIG. 9. As shown, the top of the base portion 902 may include (e.g., on or near the top tray 904) light/brightness controls 1402 similar to that of light/brightness control 126.

Figure 15:
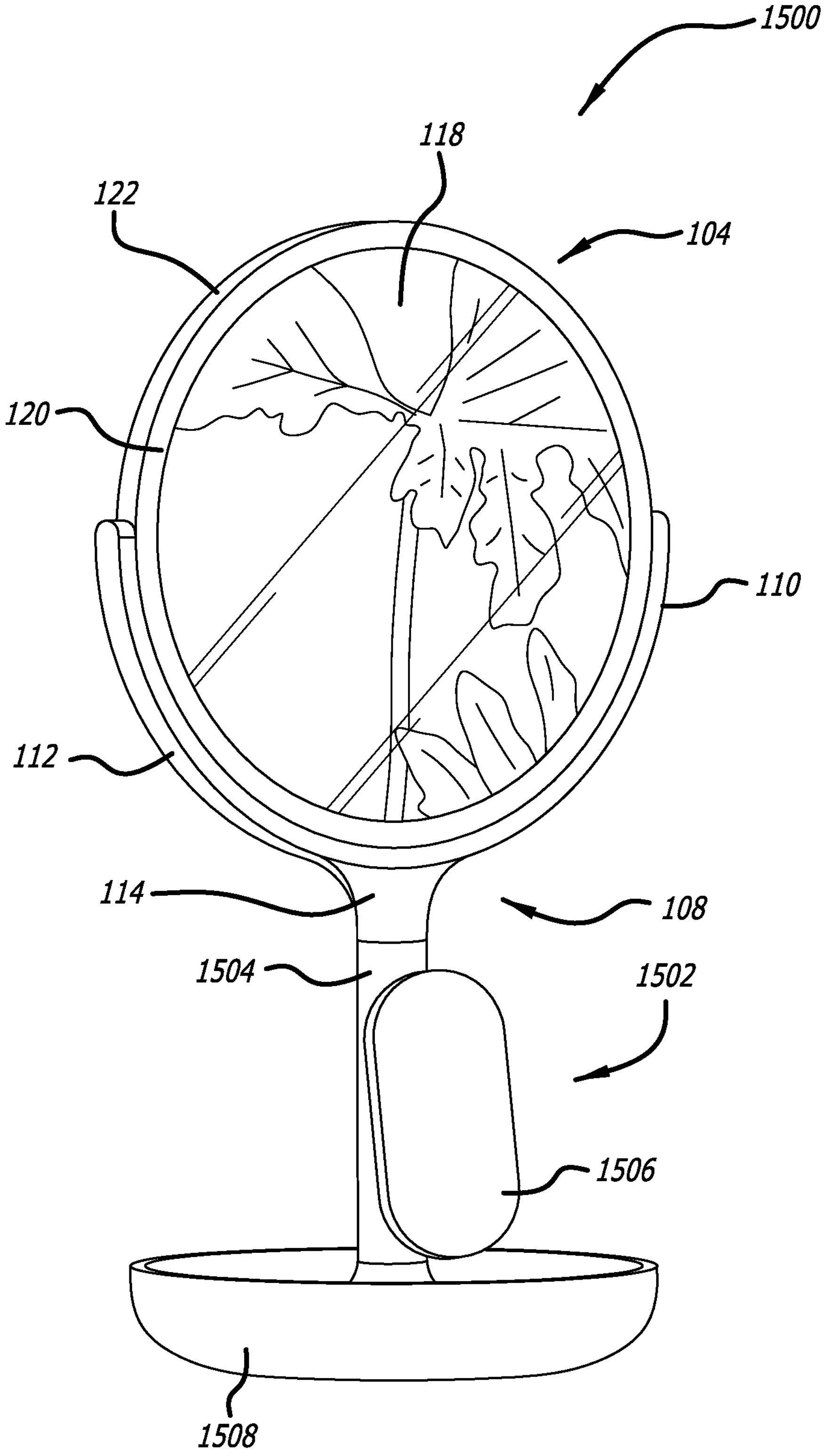
FIG. 15 is a front perspective view of the front side of another example of a vanity mirror of the present invention.

FIG. 15 is a front perspective view of the front side of another example of a vanity mirror 1500 of the present invention. In particular, FIG. 15 shows a vanity mirror including all the same structure/parts as shown and described in connection with vanity mirror 100 and 900 except with a different base portion 1502. In particular, the base portion 1502 of vanity mirror 1500 may have wireless charging capability. The base portion 1502 may include a base shaft 1504, a wireless charging pad (or electrical charger) 1506 attached to the base shaft 1504 and a base 1508. The wireless charging pad 1506 may provide wireless charging through electromagnetic induction. Such induction charging technology is well known in the prior art. For example, the wireless charging pad 1506 may be a Qi wireless charger, which is an open, universal charging standard created by the Wireless Power Consortium (WPC). While the size of the wireless charging pad 1506 is shown to accommodate mobile phones (such as iPhones or Androids), it should be understood that the size of the wireless charging pad 1506 can vary to accommodate other sizes of electronic devices (big or small), such as electronic tablets, laptop computers, smart watches, wireless headphones etc. It should also be understood that while FIG. 15 shows the wireless charging pad 1506 oriented in portrait position, the wireless charging pad 1506 may also be oriented in landscape position.

Figure 16:
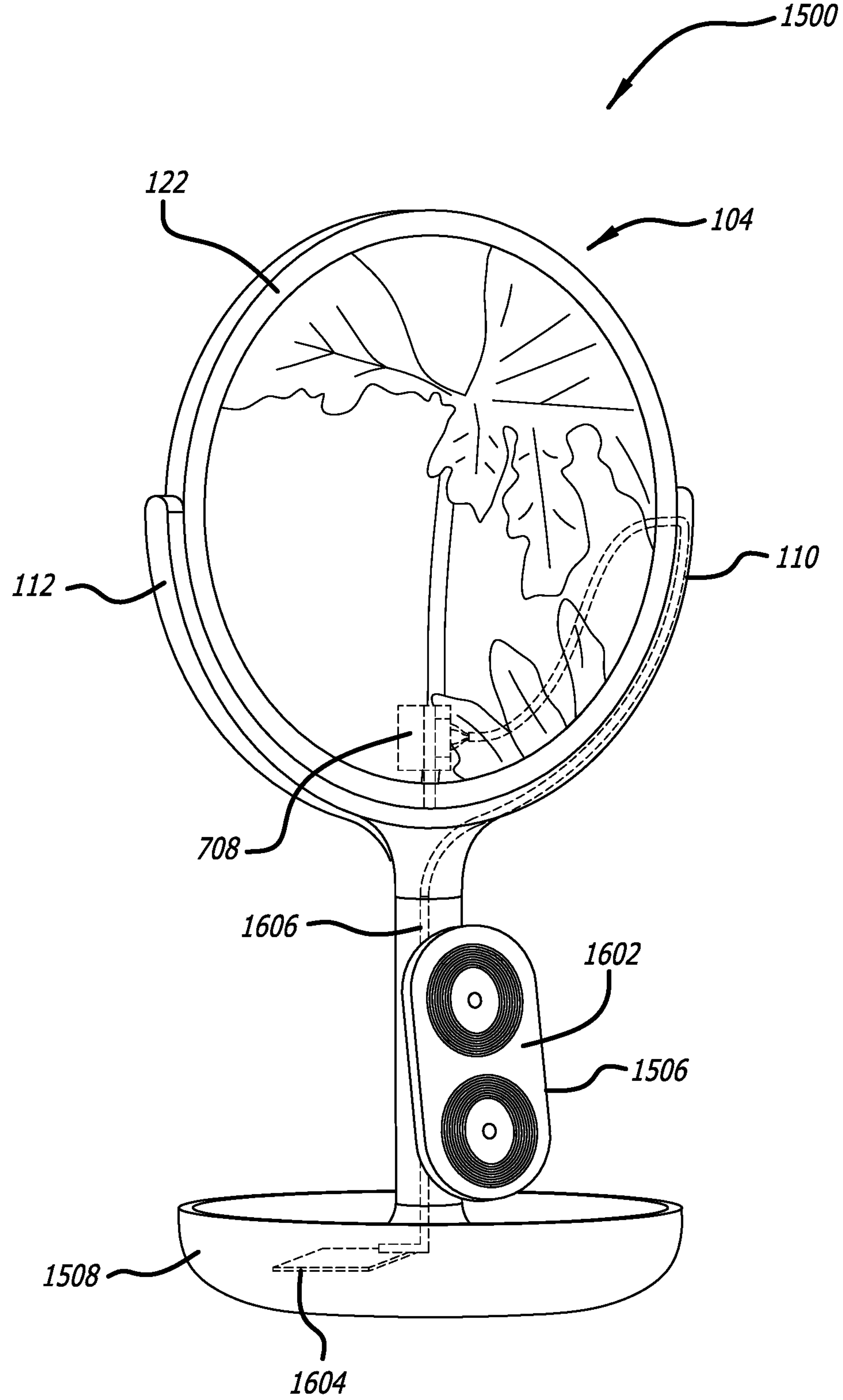
FIG. 16 is a front perspective view of the internals of the base portion of the vanity mirror of FIG. 15.

FIG. 16 is a front perspective view of the internals of the base portion 1502 of the vanity mirror 1500 of FIG. 15. In particular, the charging pad 1506 may house a charging assembly 1602 having a dual Qi coil. The dual coil may allow for maximum coverage across all electronic device sizes in both portrait and landscape orientations. The vanity mirror 1500 may further include input/output ports 1604, which may be USB ports, that provide charging to the mirror 1500 or also allow a second electronic device to be connected to the mirror 1500 and charged when plugged into the mirror 1500.

Figure 17:
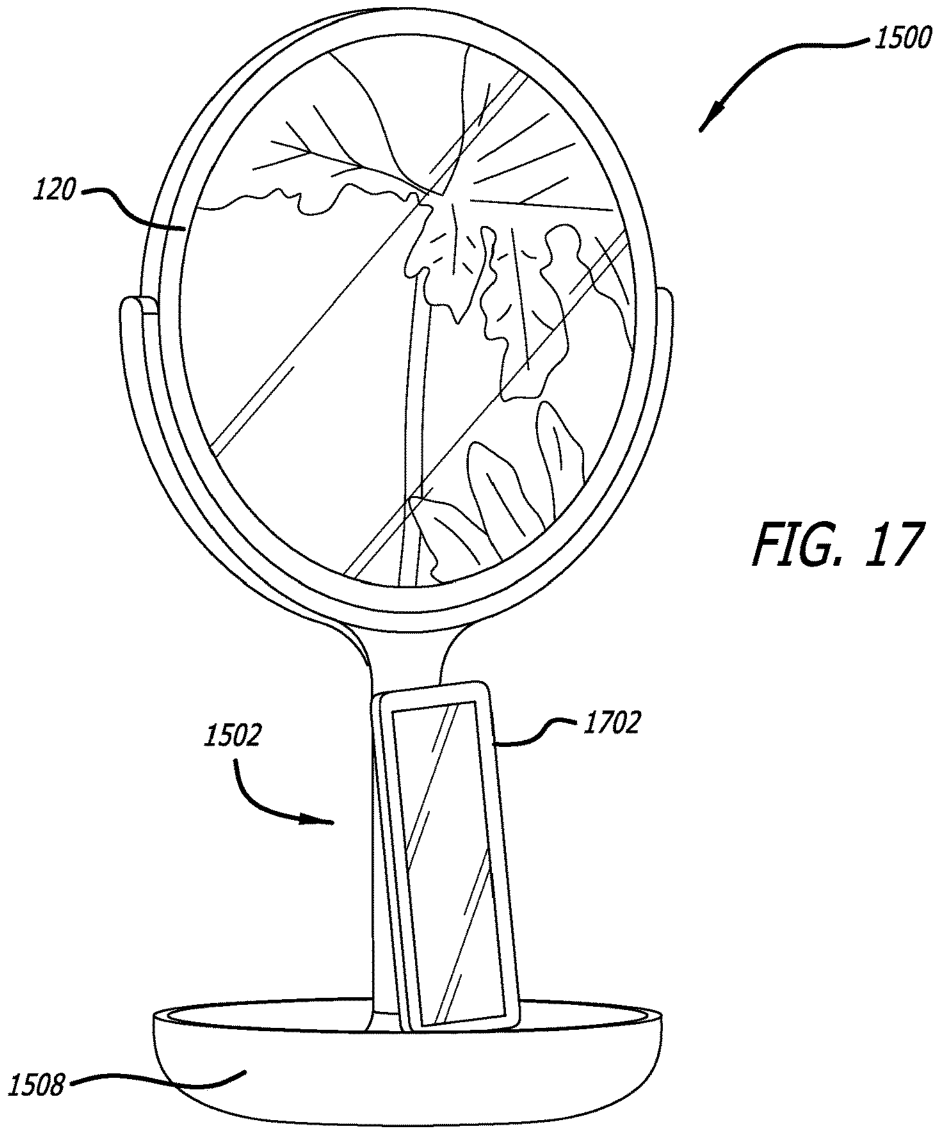
FIG. 17 is a front perspective view of the front side of the vanity mirror of FIG. 15 where a mobile electronic device is being charged on the base portion.

FIG. 17 is a front perspective view of the front side of the vanity mirror 1500 of FIG. 15 where a mobile electronic device 1702 is being charged on the charging pad 1506 of the base portion 1502.

Figure 18:
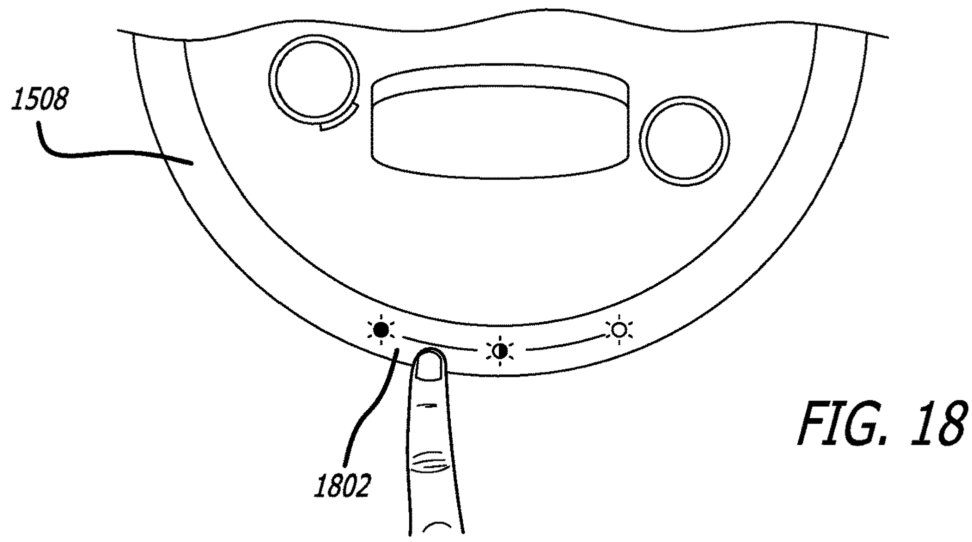
FIG. 18 is a top view of the base portion of the vanity mirror of FIG. 15.

FIG. 18 is a top view of the base portion 1502 of the vanity mirror of FIG. 15. As shown, the top of the base 1508 may include light/brightness controls 1802 similar to that of the light/brightness controls 126 and 1402. The top of the base 1508 may also be rubberized to prevent the electronic device 1702 from sliding forward when the electronic device 1702 is being charged by the wireless charging pad 1506.

The present disclosure also encompasses other implementations that include a combination of two or more of the features described above in conjunction with FIGS. 1-18. For example, an implementation may include a combination of two or more of the following: audio speakers, storage compartments, and/or wireless charging pads.

The foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A mirror, comprising:

a base portion configured to support the mirror on a surface;

a support portion connected to the base portion; and a mirror head assembly, where the support portion is configured to support the mirror head assembly, and the mirror head assembly comprises:

a front side and a back side opposing the front side;

a first mirror plate positioned at the front side;

a first light-transmissive region positioned adjacent to the first mirror plate;

a mirror frame configured to support the first mirror plate and the first light-transmissive region; and a light source disposed in an interior of the mirror head assembly and configured to emit light to at least the first light-transmissive regions;

a first electrical contact assembly, where the first electrical contact assembly comprises a first electrical contact pin rotatably electrically connected with a first electrical conductive cap such that the first electrical contact pin is rotatable relative to the first electrical conductive cap, where the first electrical conductive cap extends from the support portion radially inwardly of the mirror frame, where the rotatable electrical connection between the first electrical contact pin and first electrical conductive cap occurs within the mirror frame.

2. The mirror of claim 1, where the base portion comprises of at least one audio speaker.

3. The mirror of claim 2, where the at least one audio speaker is angled upward relative to the surface.

4. The mirror of claim 1, where the base portion comprises of at least a first speaker and a second speaker, where the base portion defines a vertical plane that extends vertically through the center of the base portion and divides the base portion into first and second side portions, where the at least first speaker is positioned on the first side of the vertical plane and where the at least second speaker is positioned on the second side of the vertical plane.

5. The mirror of claim 4, where the at least first speaker is in opposed angled mirrored relationship to the at least second speaker relative to the vertical plane.

6. The mirror of claim 1, where the base portion comprises of a plurality of storage compartments.

7. The mirror of claim 6, where the base portion comprises a column and the plurality of storage compartments are rotatably supported by the column, and each storage compartment is pivotable about the column between a closed position and an open position.

8. The mirror of claim 1, where the base portion comprises a charging pad configured for wirelessly charging an electronic device.

9. The mirror of claim 1, where the support portion comprises a first yoke arm and a second yoke arm opposing the first yoke arm, and the first yoke arm and the second yoke arm rotatably support the mirror head assembly to allow tilting of the mirror head assembly.

10. The mirror of claim 9, where the first yoke arm and the second yoke arm extend upwardly to at least partially surround the mirror head assembly.

11. The mirror of claim 1, where the support portion comprises an adjustable shaft configured to allow adjustment of a height of the mirror head assembly.

12. The mirror of claim 1, where the mirror head assembly further comprises a second mirror plate positioned at the back side and a second light transmissive region positioned adjacent to the second mirror plate.

13. The mirror of claim 1, where the light source comprises a plurality of light emitters spaced apart from each other.

14. The mirror of claim 1, where the mirror head assembly comprises of second electrical contact assembly, where the second electrical contact assembly comprises a second electrical contact pin rotatably electrically connected with a second electrical conductive cap such that the second electrical contact pin is rotatable relative to the second electrical conductive cap, where the rotatable electrical connection between the second electrical contact pin and second electrical conductive cap occurs within the mirror frame.

15. The mirror of claim 7, where a fastening mechanism is located on each storage compartment for securing each compartment in the closed positioned.

16. The mirror of claim 14, where the support portion comprises a first yoke arm and a second yoke arm opposing the first yoke arm, the first electrical contact assembly is connected to the first yoke arm, and the second electrical contact assembly is connected to the second yoke arm.

17. The mirror of claim 8, where the support portion is connected to the base portion via a shaft, where the charging pad is positioned on the shaft.

18. The mirror of claim 17, where the charging pad is angled upward relative to the surface.

19. The mirror of claim 1, where the first electrical contact pin is spring loaded.

20. The mirror of claim 1, where the brightness of the light emitted from the light source is controlled by a capacitive touch controller positioned on the base portion.

* * * * *